United States Patent Office 3,038,366
Patented June 12, 1962

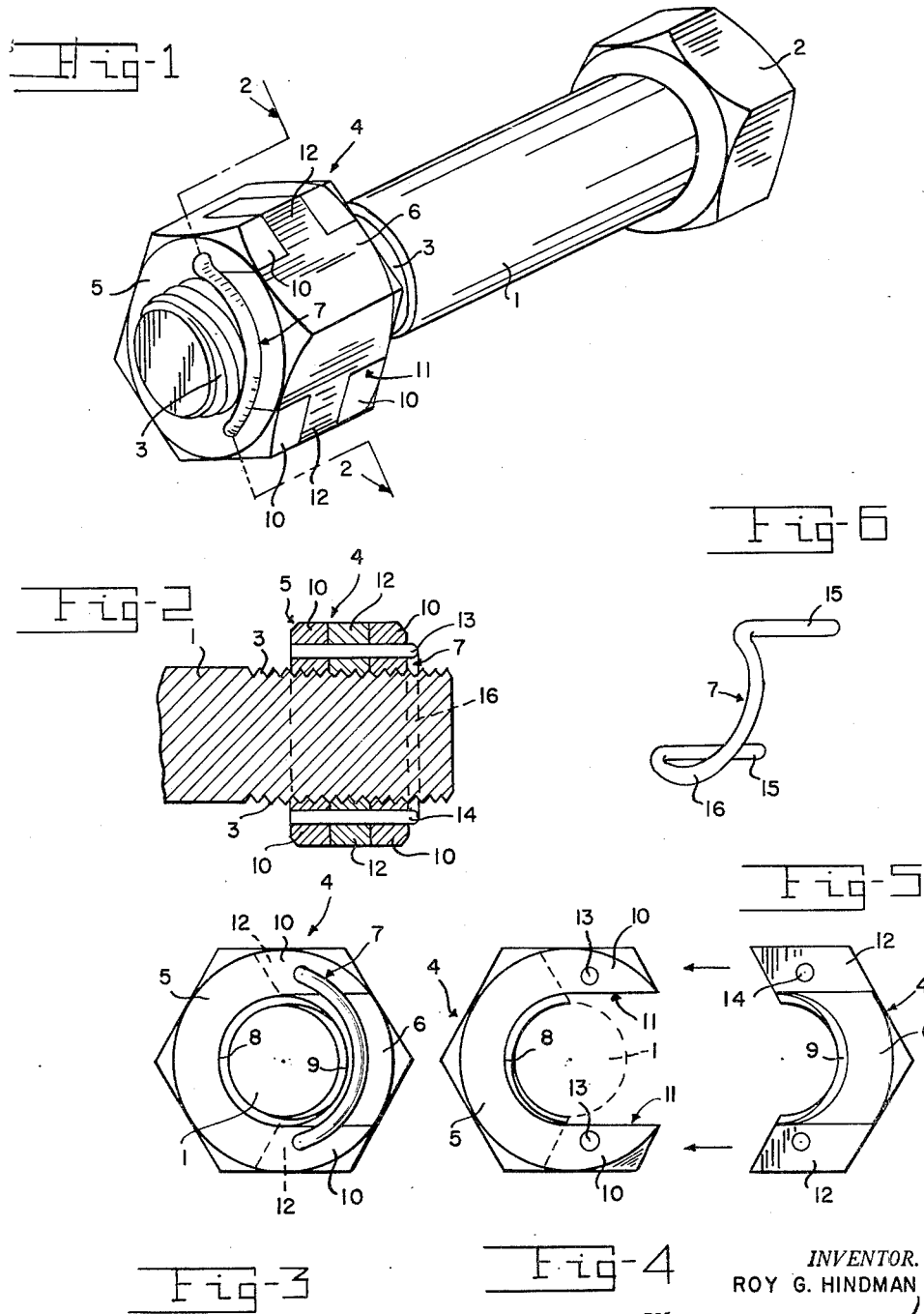
June 12, 1962 — R. G. HINDMAN — 3,038,366
SEPARATING NUT ASSEMBLY
Filed Oct. 15, 1959
INVENTOR.
ROY G. HINDMAN
BY
ATTORNEYS

3,038,366
SEPARATING NUT ASSEMBLY
Roy G. Hindman, Aurora, Calif.
(2864 B Quay Loop, Holloman AFB, N. Mex.)
Filed Oct. 15, 1959, Ser. No. 846,763
1 Claim. (Cl. 85—33)
(Granted under Title 35, U.S. Code (1952), sec. 266)

The invention described herein may be manufactured and used by or for the United States Government for governmental purposes without payment to me of any royalty thereon.

This invention relates to nuts and bolts, and more particularly to a separating or split nut design which permits its installation or removal on or from a bolt or other threaded fastener without the necessity of turning it from the end of the bolt to its final position.

One of the objects of the invention is the provision of a nut, applied to a conventional bolt which can be quickly and easily removed under practically any condition.

Another object is the provision of a split nut of complemental separable sections which can be removed in a radial direction from a conventional bolt or threaded fastener without longitudinal movement and a removable key member for securing the sections together at opposite sides of the threaded fastener or bolt.

Another object is the provision of a nut for a bolt or threaded fastener comprising two substantially semi-circular sections for embracing and engaging the threads of the bolt or fastener each in semi-circular fashion in which one of the sections has a bifurcated end at each of its opposite ends and the other section has complemental tongues at its opposite end interfitting the bifurcated end and is formed with locking apertures arranged to extend through the bifurcated ends and tongues when assembled and a common locking member or clip having a curved portion extending partly around the bolt receiving opening at one side thereof and formed with laterally extending locking extensions adapted to extend through the apertures in the bifurcated ends and tongue members at opposite sides of the bolt for locking the complemental sections together on the bolt.

A further object is the provision of a completely separable two-piece nut and a resilient one-piece locking clip for simultaneous locking engagement with both ends of both of the nut sections for securing both ends of both of the sections together.

A further object is the provision of a separable nut in which the two sections are separable and the clip can be applied from either side of the nut.

Other objects and advantages of the invention will become apparent from the following description and accompanying drawing in which like reference characters refer to like parts in the several figures.

FIG. 1 is a perspective view of a nut embodying my invention applied to a conventional threaded fastener such as a bolt;

FIG. 2 is a fragmentary longitudinal section taken about on the plane indicated by line 2—2 in FIG. 1;

FIG. 3 is an end elevation of the separable nut of the subject invention showing the same in assembled form;

FIGS. 4 and 5 are end elevation views of the two separable sections of the nut in separated relation; and FIG. 6 is a detail perspective view of the locking member or clip.

Referring to the drawing the reference numeral 1 denotes a conventional bolt or threaded fastener having a head 2 and threaded nut receiving portion 3, while the separable nut structure of the invention is illustrated generally at 4.

The nut comprises two complemental sections 5 and 6 and a resilient locking member or clip 7.

The members or sections 5 and 6 when fitted together form the shape and general configuration of a conventional nut, each having a semi-circular recess respectively indicated at 8 and 9.

The section or portion 5 is formed with bifurcated end portions to spaced tongue members 10 at each of its opposite ends with parallel side walls, the tongue members having their inner surfaces 11 extending tangent to the outer surface of the threaded portion of the bolt in parallel relation to each other as shown in FIG. 4.

The complemental portion or section 6 is formed with intermediate parallel tongue members 12 formed to fit the space between the spaced tongue members 10 as shown in the drawing.

The spaced tongue members 10 and the intermediate tongue members are provided with registering apertures 13 and 14 when the parts 5 and 6 are assembled as shown to receive the opposite parallel locking ends 15 of the locking member or clip 7.

It should be noted that the locking clip is a single or one-piece member having the extensions 15 projecting therefrom at opposite ends of the curved portion 16 in parallel relation to each other and the curved portion 16 is shaped to extend around the periphery of the bolt 1 and the threaded opening in the nut so as to lie flush or substantially flush on the top side of the separable nut structure 4, the diameter of the ends 15 being such as to snugly fit the openings 13 and 14. This clip is preferably formed of hard resilient or tempered rod material to counteract the shearing action thereon.

The operation of the device is self-evident. After the two parts 5 and 6 are assembled on the threaded portion of the bolt 1 the clip 7 is inserted in position with the stem extensions 15 locking the nut parts 5 and 6 together and the nut can be tightened in the conventional manner. When the nut is loosened a screw-driver bit can be inserted under the curved portion 16 and the clip pried out permitting the two parts 5 and 6 to separate and be removed from the threaded portion of the bolt 1 in a self-evident manner.

Having thus described the invention which I claim as new is set forth in the appended claim.

I claim:

A separable two-piece nut comprising a pair of semi-circular thread-engaging members, each having a semi-circular thread-engaging portion, one of said members having a pair of parallel tongue members projecting in parallel relation to each other from each end, tangent to the thread-engaging portion in planes normal to the axis of the nut, the other of said members having a tongue member projecting from each end parallel to each other tangent to its semi-circular threaded portion, shaped to fit the space between the parallel tongue members at the opposite ends of the said one member, said tongue members each having aligned locking apertures extending therethrough parallel to the axis of the thread-engaging portions and a resilient clip having parallel end extensions spaced apart to extend through the apertures in the tongue members to lock the threaded portions together, said clip having an intermediate arcuately bowed portion connecting said end extensions disposed in a plane substantially perpendicular to said parallel end extensions curved to extend between the locking apertures across the outer end of the nut in radially spaced relation to at least one of the semi-circular thread-engaging portions and within the outer periphery of the nut.

References Cited in the file of this patent

UNITED STATES PATENTS

| 1,176,795 | Vanderburg | Mar. 28, 1916 |
| 1,510,492 | Caron et al. | Oct. 7, 1924 |
| 2,192,165 | Caldwell | Feb. 29, 1940 |
| 2,377,581 | Shaffrey | June 5, 1945 |